US009985535B2

United States Patent
Kawashima

(10) Patent No.: US 9,985,535 B2
(45) Date of Patent: May 29, 2018

(54) CONTROL CIRCUIT OF SWITCHING POWER SUPPLY, INSULATED SWITCHING POWER SUPPLY

(71) Applicant: FUJI ELECTRIC CO., LTD., Kawasaki-shi, Kanagawa (JP)

(72) Inventor: Tetsuya Kawashima, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days. days.

(21) Appl. No.: 15/666,539

(22) Filed: Aug. 1, 2017

(65) Prior Publication Data
US 2018/0076716 A1 Mar. 15, 2018

(30) Foreign Application Priority Data
Sep. 9, 2016 (JP) ................... 2016-176484

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 2001/0009* (2013.01)

(58) Field of Classification Search
None
See application file for complete search history.

(56) References Cited

U.S. PATENT DOCUMENTS

| | | | | |
|---|---|---|---|---|
| 2008/0284479 A1* | 11/2008 | Mlcousek | ............... | H02M 1/08 327/175 |
| 2010/0026391 A1* | 2/2010 | Brekelmans | ............ | H03F 1/308 330/296 |
| 2012/0170335 A1* | 7/2012 | Lee | ........................ | H02M 3/156 363/89 |
| 2014/0312969 A1* | 10/2014 | Hamond | ............... | H02M 3/335 330/251 |

FOREIGN PATENT DOCUMENTS

JP 2012-161147 A 8/2012

* cited by examiner

*Primary Examiner* — Jeffrey Gblende
(74) *Attorney, Agent, or Firm* — Rabin & Berdo, P.C.

(57) ABSTRACT

A negative power supply generates a voltage Vm that is negative when a source voltage Vh' of an activation element is used as a reference. A differential voltage between the above-described voltage Vh' and the voltage Vm is applied to an activation circuit arranged between the activation element and a control power supply voltage Vcc. The activation circuit is configured to include a current detection resistor, a voltage conversion resister, a current source, a first PMOS switch, a second PMOS switch, and a control amplifier. The control amplifier operates in a voltage range between Vh' and Vm, and an output of the control amplifier is connected to a gate of the first PMOS switch.

18 Claims, 6 Drawing Sheets

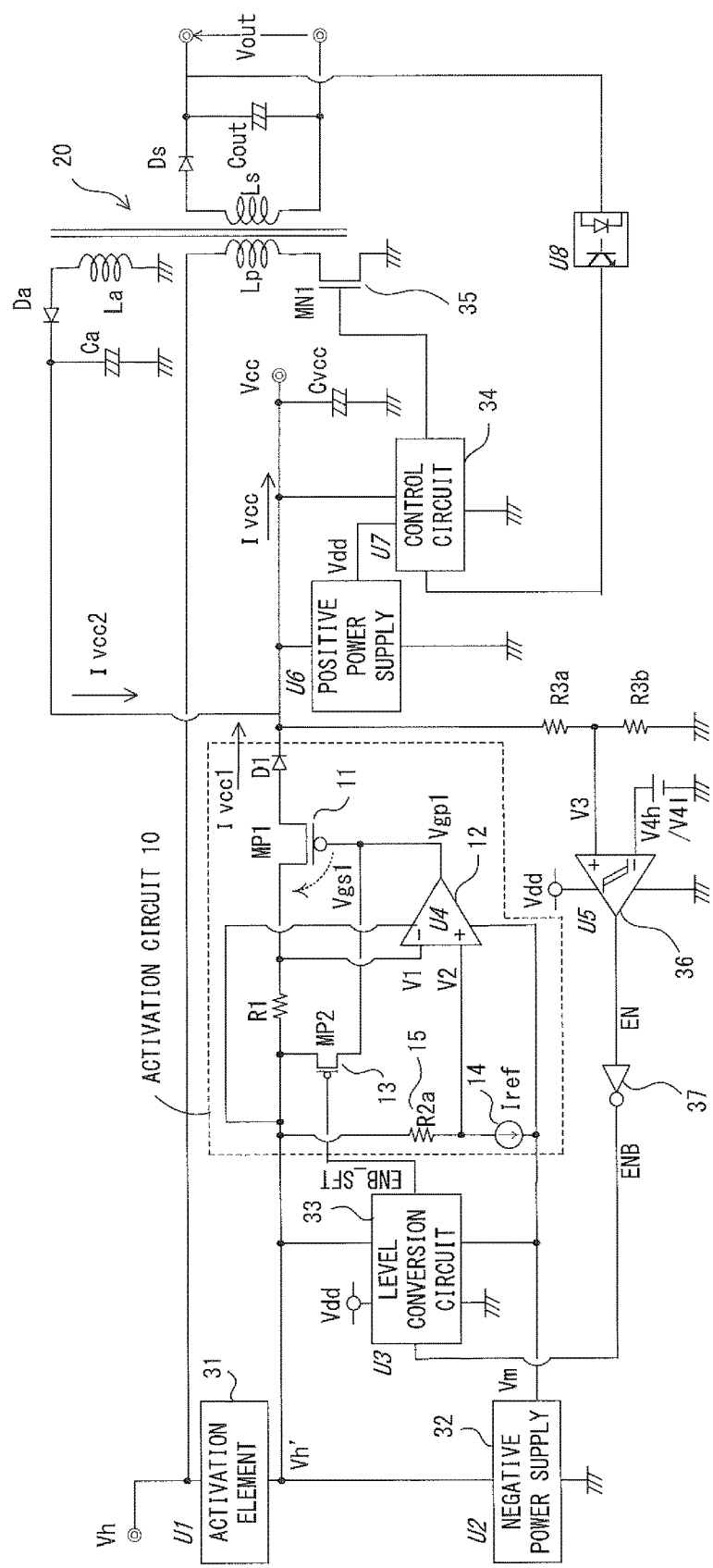
F I G. 1

CONTROL CIRCUIT OF SWITCHING POWER SUPPLY, INSULATED SWITCHING POWER SUPPLY

CROSS REFERENCE TO RELATED APPLICATIONS

This application is based upon and claims the benefit of priority of the prior Japanese Patent Application No. 2016-176484, filed on Sep. 9, 2016, the entire contents of which are incorporated herein by reference.

BACKGROUND OF THE INVENTION

Field of the Invention

The present invention relates to a control circuit of a switching power supply, and more specifically to an activation circuit including an activation switch that supplies an activation current and to a control circuit of a switching power supply that includes the activation circuit, wherein the activation circuit and the control circuit can be realized without using a thick-film gate process.

Description of the Related Art

For example, an integrated circuit for controlling a power supply disclosed in Japanese Laid-open Patent Publication No. 2012-161147 is known as a conventional control circuit of a switching power supply.

FIG. 5 illustrates a configuration of an integrated circuit for controlling a power supply that is described in FIG. 1 of Japanese Laid-open Patent Publication No. 2012-161147.

An integrated circuit 100 for controlling a power supply shown in FIG. 5 makes it possible to prevent a variation in time needed for a power supply activation due to a variation in temperature of an activation current in a switching power supply.

In other words, when a switching power supply 400 is activated, a capacitor 304 connected to a power supply terminal Vcc of the integrated circuit 100 for controlling a power supply is charged through a current limiting element 104 and a constant current supplying circuit 105 that are included in the integrated circuit 100 for controlling a power supply, using, as a power supply, a high-voltage input supplied to a high-voltage input terminal Vh.

Accordingly, in the integrated circuit 100 for controlling a power supply, a reference voltage circuit B 103, a control circuit 101, and a protection circuit 102 are supplied with a power supply voltage from the power supply terminal Vcc, and a reference voltage and a reference current that are needed for the control circuit 101 and the protection circuit 102 are supplied from the reference voltage circuit B 103.

In the following descriptions, Vh, Vcc, and Vout are used as a terminal or a voltage (a power supply).

The switching power supply 400 shown in FIG. 5 controls ON/OFF of a switching (SW) element 301 so as to convert a DC voltage Vh into a DC voltage Vout.

Upon activation, an activation current flows from the input voltage Vh through the current limiting element 104 and the constant current supplying circuit 105 such that the capacitor 304 is charged with the activation current. The potential of the capacitor 304 is increased as the charging of the capacitor 304 proceeds, and is finally applied to, for example, the control circuit 101 as a power supply (a control power supply) Vcc.

Further, the switching power supply 400 includes an auxiliary winding 203, a rectifying diode 305, and the capacitor 304, and when an switch operation is started, the terminal Vcc is also supplied with current from the auxiliary winding 203 in addition to the input voltage Vh.

FIG. 6 illustrates an example of a configuration of the integrated circuit for controlling a power supply that is described in FIG. 2 of Japanese Laid-open Patent Publication No. 2012-161147.

An activation circuit in the integrated circuit 100 for controlling a power supply includes activation elements (HV-JFET1 and HV-JFET2), the constant current supplying circuit 105 including an activation switch (M0), and reference voltage circuits (reference voltage circuits A and B, and a selection circuit), as illustrated in FIG. 6.

The constant current supplying circuit 105 is configured to include a differential amplifier AMP1, an N-channel MOSFET (N-channel metal-oxide-semiconductor field-effect transistor, which is also referred to as NMOS) M0 (activation switch M0), and resistors Rx and Ry that specify an input voltage of AMP1.

The drain side of the N-channel MOSFET M0 (activation switch M0) is connected to an input terminal on the (−) side of AMP1, a gate of the N-channel MOSFET M0 is connected to an output terminal of AMP1, and the N-channel MOSFET M0 outputs an activation current Icc from its source side.

The amplifier AMP1 in the constant current supplying circuit 105 is provided with a voltage between a voltage Vh" from the activation element HV-JFET2 and GND as a power supply, so a gate voltage of the activation switch M0 will be Vh" at the maximum.

As illustrated in FIG. 6, when a voltage Vcc that is also a source voltage of the activation switch M0 in the constant current supplying circuit 105 is increased and a potential difference between the voltage Vcc and the source voltage Vh" of the activation element HV-JFET that is a maximum gate voltage falls below a threshold, the activation switch M0 is turned off so as to stop a current supply from Vh.

Accordingly, the power supply Vcc enters into an operational state in which the power supply Vcc is maintained only with the current supply from the auxiliary winding 203, which results in being able to reduce the current used in the integrated circuit.

Further, when the technology disclosed in Japanese Laid-open Patent Publication No. 2012-161147 is used, the gate of the activation switch M0 is controlled such that a constant activation current flows through the amplifier AMP1 in the constant current supplying circuit 105 until the activation switch M0 is turned off, wherein the activation current is determined using the Formula 1:

$$Icc \approx Vref \times Rx/(Ry \times Rc) \quad \text{(Formula 1)}$$

For Vref in Formula 1, a higher voltage is selected by a selection circuit 107 from among an output Va (concretely, Va−Vth6) of a reference voltage circuit A and an output Vb (concretely, Vb+Vbe1−Vbe2) of a reference voltage circuit B, wherein Va is selected just after the activation so that the flow of the activation current is suppressed and Vb is selected when Vcc is increased, so that a control is performed such that a desired constant current flows.

In the case of the circuit configuration disclosed in Japanese Laid-open Patent Publication No. 2012-161147 described above, for example, a voltage of 30V is applied to the activation element source voltages Vh' and Vh", and to the control circuit power supply voltage Vcc, although it depends on the specification of the switching power supply and the features of the activation elements HV-JFET.

Thus, a withstand voltage greater than or equal to 30V is needed between a drain and a source in the activation switch M0 that controls an activation current, and a withstand voltage greater than or equal to 30V is also needed between a gate and the source in the activation switch M0, although this is not disclosed in Japanese Laid-open Patent Publication No. 2012-161147. A circuit configuration having a withstand voltage greater than or equal to 30V between a gate and a source can be realized only by a thick-film-gate manufacturing process, and the manufacturing process for the circuit configuration provided by the conventional technology disclosed in Japanese Laid-open Patent Publication No. 2012-161147 is limited.

SUMMARY OF THE INVENTION

An object of the present invention is to provide a control circuit of a switching power supply in which an activation switch and a control circuit controlling the activation switch that are included in the switching power supply are manufactured by a manufacturing process that does not need a thick-film gate process that affects costs.

In order to solve the problems above, a control circuit of a switching power supply is provided that controls a switching element using a switching control circuit so as to convert a DC input voltage into a DC output voltage, the control circuit of a switching power supply comprising an activation element that decreases the DC input voltage so as to generate a second input power supply voltage, an activation circuit that generates a first activation current from the second input power supply voltage when the switching power supply is activated, so as to control a voltage of a control power supply that is applied to the switching control circuit, and a negative power supply that generates a power supply voltage that is negative when the second input power supply voltage output from the activation element is used as a reference.

The activation circuit further includes a current detection resistor whose one end is connected to the second input power supply voltage, a first PMOSFET that is connected between another end of the current detection resistor and the control power supply, and a control amplifier that is constituted of an operational amplifier that is controlled to operate in a range between the second input power supply voltage and a negative voltage output from the negative power supply, in order to generate the first activation current from the second input power supply voltage.

The control amplifier obtains a first input voltage from the other end of the current detection resistor, obtains a second input voltage from an output of a constant voltage source whose one end is connected to the second input power supply voltage, and inputs an output of the control amplifier to a gate of the first PMOSFET, so as to obtain the first activation current when the switching power supply is activated.

BRIEF DESCRIPTION OF THE DRAWINGS

FIG. 1 illustrates a configuration of a control circuit of a switching power supply according to embodiments of the present invention;

DETAILED DESCRIPTION

Figure 2:
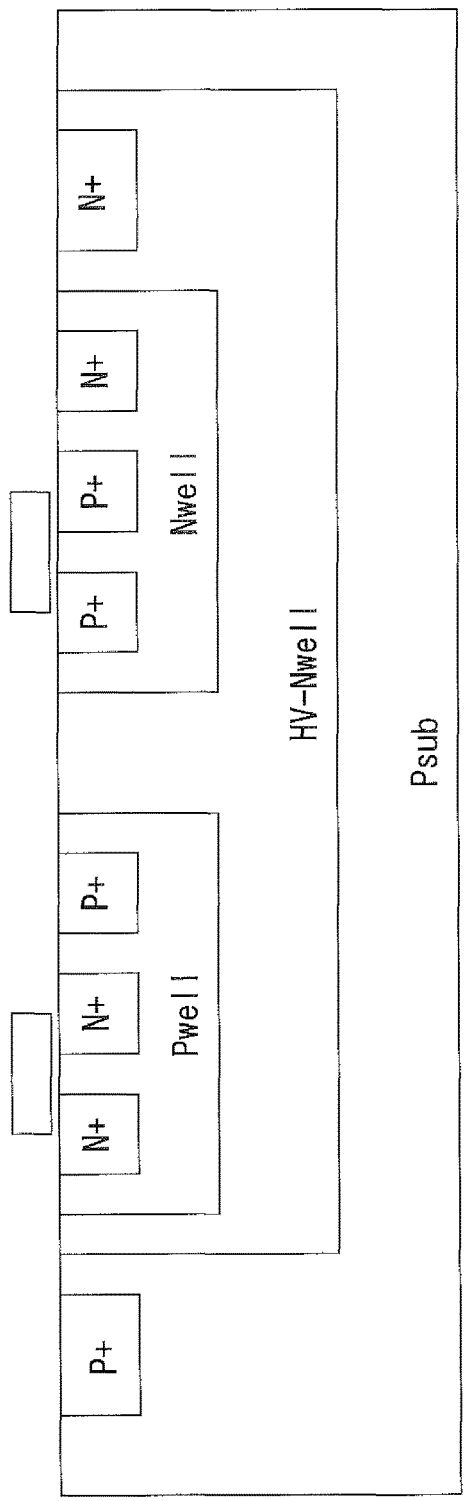
FIG. 2 is a cross-sectional view of a semiconductor structure that realizes a low-withstand voltage gate and a low-withstand voltage drain according to the embodiments of the present invention.

Embodiments of the present invention will now be described in detail.

FIG. 1 illustrates a configuration of a control circuit of a switching power supply according to embodiments of the present invention. The control circuit of a switching power supply illustrated in FIG. 1 is configured to include an activation element 31 (U1), a negative power supply 32 (U2), an activation circuit 10, a level conversion circuit 33 (U3), a switching element control circuit 34 (U7), an NMOS switching element 35 (MN1), and a comparator 36 (U5).

The control circuit of a switching power supply illustrated in FIG. 1 converts a DC input voltage (a first input voltage) Vh into a DC output voltage Vout by controlling the switching element (SW element) 35 (MN1) using the switching element control circuit 34. In the following descriptions, Vh, Vh', Vcc, and Vout are used as a terminal name, a voltage name, or a power supply name.

The switching power supply illustrated in FIG. 1 is insulated, and an input side (a primary side) and an output side (a secondary side) are coupled to each other by a transformer 20.

A drain of the NMOS switching element (SW element) 35 is connected to a winding Lp on the primary side of the transformer 20, and its source is grounded. Its gate is turned on/off by a switching control voltage supplied from the switching element control circuit 34 (U7).

A high voltage Vh on the primary side is supplied to the winding Lp on the primary side of the transformer 20 through a high-voltage input terminal Vh, and voltage is induced in a winding Ls on the secondary side of the transformer 20 due to an inductive coupling of a transformer.

A DC output Vout of a predetermined voltage is taken from the induced voltage through a rectifying and smoothing circuit that includes a diode Ds and a capacitor Cout that are connected to the winding Ls on the secondary side.

Likewise, voltage is induced in an auxiliary winding La of the transformer 20 due to an inductive coupling of a transformer, and current Ivcc2 is supplied by the induced voltage to a capacitor Cvcc through a diode Da that is connected to the auxiliary winding La, so as to ensure a voltage of a power supply (control power supply) terminal Vcc.

On the other hand, upon activating a switching power supply before the switching operation is started, activation current Ivcc1 is supplied from an input voltage Vh' to the capacitor Cvcc through the activation element 31 and the activation circuit 10, so as to ensure a power supply voltage Vcc.

The activation circuit 10 supplies, to a power supply Vcc of the switching element control circuit 34, the activation current Ivcc1 obtained from the DC input voltage Vh through the activation element 31 until the SW element 35 becomes operable. When the SW element 35 becomes operable, it is possible to break the current Ivcc1 that flows from the high-voltage input terminal Vh to the capacitor Cvcc with the activation circuit 10.

The activation element 31 (U1) may include a high-withstand voltage JFET (high-withstand voltage junction field-effect transistor), and a source voltage Vh' that is an output of the activation element 31 is generated and output from the DC voltage Vh.

The negative power supply 32 (U2) generates and outputs, from the source voltage Vh' of the activation element 31 described above, a voltage Vm that is relatively negative with respect to the source voltage Vh'. An example of a circuit configuration of the negative power supply 32 (U2) will be described later.

A differential voltage (Vh'−Vm) between the above-described source voltage Vh' of the activation element 31 and the above-described output voltage Vm of the negative power supply 32 (U2) is applied to the activation circuit 10.

In this example, this differential voltage (Vh'−Vm) is controlled so as to not exceed a voltage (such as 5 V) that is appropriate to operate a typical semiconductor logic circuit.

Here, the configuration of the activation circuit 10 is further described.

The activation circuit 10 is configured to include a PMOS switch 11 (MP1) that is an activation switch, a control amplifier 12 (U4) that is constituted of an operational amplifier that controls a gate of the PMOS switch 11, a voltage conversion resistor 15 (R2a), a current source 14 (Iref), a current detection resistor R1, and an enable switch 13 (MP2).

The PMOS switch 11 (MP1) is constituted of a P-channel MOSFET (P-channel metal-oxide-semiconductor field-effect transistor, which is also referred to as PMOS) having a low-withstand voltage gate (such as 5 V) and a high-withstand voltage drain (such as 30V).

The current detection resistor R1, the PMOS switch (MP1), and a backflow prevention diode Dl are series-connected to one another between the source voltage Vh' of the activation element 31 and the Vcc terminal. The current detection resistor R1 is connected to a source of the PMOS switch 11, and an anode of the backflow prevention diode Dl is connected to a drain of the PMOS switch 11 (MP1).

An output of the control amplifier 12 (U4) and a drain of the enable switch 13 (MP2) are connected to the gate of the PMOS switch 11 (MP1).

When the enable switch 13 (MP2) is off, the PMOS switch 11 is brought into conduction and the activation current Ivcc1 (a first activation current) is supplied to the power supply terminal Vcc.

Here, an output voltage Vgp1 of the control amplifier 12 is provided to the gate of the PMOS switch 11 (MP1). Further, when the enable switch 13 (MP2) is on, the source voltage Vh' of the activation element 31 is provided to the gate of the PMOS switch 11 (MP1) and the PMOS switch 11 (MP1) is turned off.

A detected voltage V1 of the current detection resistor R1 and a voltage V2 between the voltage conversion resistor 15 (R2a) and the current source 14 (Iref) are input to the control amplifier 12 (U4). An output of the level conversion circuit 33 (V3) is input to a gate of the enable switch 13 (MP2).

The control amplifier 12 (U4) operates such that the voltage V1 and the voltage V2 are equal to each other due to a virtual short between two input terminals. Further, the source voltage Vh' of the activation element 31 and the output voltage Vm of the negative power supply 32 (U2) are applied to the control amplifier 12 as a power supply, which causes the control amplifier 12 to operate due to the differential voltage (Vh'−Vm) described above.

The enable switch 13 (MP2) is arranged between the source voltage Vh' of the activation element 31 (U1) and the gate of the PMOS switch 11. A source of the enable switch 13 (MP2) is connected to the source voltage Vh' of the activation element 31, and the drain of the enable switch 13 (MP2) is connected to the gate of the PMOS switch 11 (MP1). An output ENB_SFT of the level conversion circuit 33 (U3) is input to the gate of the enable switch 13 (MP2).

The control circuit of a switching power supply illustrated in FIG. 1 includes the negative power supply 32 (U2) that outputs the voltage Vm that is negative when the source voltage Vh' of the activation element 31 is used as a reference (for example, Vm=Vh'−5V), the voltage Vm being a voltage that is relatively negative with respect to the voltage Vh' used as a reference. Thus, the activation circuit 10 is configured to be connected between the activation-element source voltage Vh' and the negative-power-supply output voltage Vm so as to operate.

For example, when the activation-element source voltage Vh' is about 30V, Vm=Vh'−5V=25V because the negative-power-supply output voltage Vm is set such that Vm=Vh'−5V as described above, which results in a differential voltage (Vh'−Vm=5V) being applied to the activation circuit 10.

A bandgap circuit that is known to persons skilled in the art is provided within the negative power supply 32 (U2), and when the input DC voltage Vh is increased, an output of the bandgap circuit of the negative power supply 32 whose power supply is the activation-element source voltage Vh' is started, and a reference voltage (Vh'-2.5V) that is negative when the voltage Vh' is used as a reference is output by the output of the bandgap circuit. Then, the voltage (Vh'−5V) when the voltage Vh' is used as a reference is generated and output from the negative power supply 32 on the basis of the negative reference voltage. An example of the circuit configuration of the negative power supply 32 will be described in detail with reference to FIG. 4.

The control circuit of a switching power supply illustrated in FIG. 1 further includes the comparator 36 (U5) that determines whether a voltage of the control power supply Vcc is not less than a threshold, and the level conversion circuit 33 (U3) that converts the output level of the comparator 36 into a level of a signal in a voltage range between Vh' and Vm so as to obtain a signal input to the gate of the enable switch 13 (MP2).

As illustrated, the comparator 36 (U5) is a hysteresis comparator and is provided with V4h and V4l as reference power supply voltages for comparison.

The output of the comparator 36 (U5) is changed to "High" (H) when a division voltage V3 obtained by dividing Vcc by voltage division resistors R3a and R3b exceeds V4h, and is change to "Low" (L) when the division voltage V3 falls below V4l.

An output EN of the comparator 36 (U5) is inverted by a NOT circuit 37 (illustrated) into a signal ENB (illustrated), and the signal ENB is input to the level conversion circuit 33 (U3).

The level conversion circuit 33 (U3) converts (level-shifts) a potential of the input signal ENB (a logic signal between 0 and Vdd) to a logic signal between Vm and Vh', and outputs the input signal as output signal "ENB_SFT". This is represented by "_SFT" included in the signal name "ENB_SFT" of an output signal of the level conversion circuit 33 (U3), and the output signal "ENB_SFT" is input to the gate of the enable switch 13 (MP2).

Just after the control circuit of a switching power supply illustrated in FIG. 1 is activated, the output of the comparator 36 (U5) is "Low" (L), and this results in the output of the level conversion circuit 33 (U3) that operates with a differential voltage due to the negative power supply being "High" (H). Therefore, the enable switch 13 (MP2) is turned off, and the gate of the activation PMOS switch 11 (MP1) is controlled by the output of the control amplifier 12 (U4).

The control amplifier 12 operates in a voltage range between Vh' and Vm, so only a voltage that is not greater than "Vh'−Vm" is applied as Vgs1 (a voltage between a gate and a source) of the PMOS switch 11 (MP1). Thus, the PMOS switch 11 (MP1) may have a low-withstand voltage gate. In other words, there is no need for a manufacturing process that makes a gate withstand voltage of a MOSFET high.

The control amplifier 12 (U4) performs a control such that "Vh'−V1" is equal to "Vh'−V2" in order to limit the current Ivcc1 which flows through the PMOS switch 11 and the current detection resistor R1. The limitation value of the current Ivcc1 is determined by resistance values of the current detection resistor R1 and the voltage conversion resistor 15 (R2a), and by a current value Iref of the current source 14. In other words, in the case of the circuit configuration of FIG. 1, it is represented by $$Vh'-V2=R2a\times Iref.$$

This value is fixed, and the voltage conversion resistor 15 (R2a) through which a constant current Iref flows functions as a constant voltage source.

On the other hand, since Vh'−V1=R1×Ivcc1, wherein "Vh'−V1"="Vh'−V2" due to the virtual short of two input voltages of the control amplifier 12 (U4), $$Ivcc1=(R2a/R1)\times Iref$$

is derived. Accordingly, the activation current Ivcc1 is controlled at a constant value.

The low-withstand voltage gate indicates that a withstand voltage between a gate and a source is low, and a "PMOS having a high-withstand voltage drain" indicates that a withstand voltage between a source and a drain of the PMOS is high.

In the field of IC technology, a scheme is often used that increases a withstand voltage between a source/drain and a substrate using a DMOS (double-diffused MOSFET) that is formed by performing a double diffusion, in order to improve a withstand voltage between the source and the drain.

On the other hand, a withstand voltage between a gate and a source is affected by a thickness of a gate oxide, so it is not possible to increase a withstand voltage between a gate and a source unless the gate oxide is made thick, even if the DMOS is used.

Thus, conventionally, there has been a need for a process that includes using a double diffusion technology in order to increase a withstand voltage between a source and a drain, and forming two types of gate oxides thicknesses in order to increase a withstand voltage between a gate and the source. This makes processing complicated and has an adverse effect on the cost.

On the other hand, in the PMOS switch 11 (MP1) according to the embodiments of the present invention, there is no need to increase a withstand voltage between a gate and a source as described above, which provides an advantage such that there is no need for a process of making a gate oxide thick when the PMOS switch 11 (MP1) is manufactured.

As described above, the control amplifier 12 (U4), the enable switch 13 (MP2), and the level conversion circuit 33 (U3) may each include a MOSFET whose gate withstand voltage and drain withstand voltage are both low. Further, as illustrated in FIG. 2 that will be described below, a semiconductor substrate and a portion in which the MOSFET is formed are separated by a high-withstand voltage (HV) WELL that can withstand the voltage Vh' when the voltage Vh' is applied.

Further, a MOSFET that is included in the negative power supply 32 (U2) may also have a circuit configuration in which there is no need for a high-withstand voltage gate.

In the following, FIG. 2 is described.

FIG. 2 is a cross-sectional view of a semiconductor structure that realizes a low-withstand voltage gate and a low-withstand voltage drain according to the embodiments of the present invention.

With respect to the control amplifier 12 (U4) and the enable switch 13 (MP2) that are included in the activation circuit 10, and the level conversion circuit 33 (U3) that is not included in the activation circuit 10 according to the embodiments of the present invention, the cross-sectional view of a semiconductor structure indicates that MOSFETs having a low-withstand voltage gate and a low-withstand voltage drain are used in order to make a manufacturing process more advantageous.

In general, all of these components are low-withstand voltage devices, and in order to realize the structure, an Si substrate and a portion in which a MOSFET is formed are separated by a high-withstand voltage (HV) WELL (HV-Nwell:high-withstand voltage n-type WELL region) that can withstand the voltage Vh' when the voltage Vh' is applied, as illustrated in FIG. 2. In this case, the low-withstand voltage device refers to a device having a low-withstand voltage gate and a low-withstand voltage drain.

In general, in a process of manufacturing a semiconductor, both a low-withstand voltage device and a high-withstand voltage device can be formed on one Si substrate (Psub (P-substrate) in this example). Further, a Psub (P-substrate) is generally connected to a GND potential.

In the cross-sectional structure of a semiconductor illustrated in FIG. 2, a PMOSFET of the enable switch 13 (MP2) of FIG. 1 is realized in, for example, a structure in which it is surrounded by an Nwell.

A source terminal (that corresponds to one of the components P+ in the Nwell of FIG. 2) of the enable switch 13 (MP2) is connected to a power supply Vh' as illustrated in FIG. 1, and this Vh' potential can be increased, for example, up to 30V. In other words, a withstand voltage of 30V is needed between the source terminal and a GND terminal (Psub).

In this case, if there does not exist an HV-Nwell in the structure of the enable switch 13 (MP2), a leakage will occur because a withstand voltage between an Nwell and a Psub is low (for example, about 20V), and then the enable switch 13 will not function as a PMOS switch.

In order to avoid the situation described above, a high-withstand voltage HV-Nwell is formed between an Nwell and a Psub (GND) as in the structure illustrated in FIG. 2, which results in not causing a leakage even if the withstand voltage between an HV-Nwell and a Psub is increased up to Vh'.

The PMOS switch 11 (MP1) can be realized by a general manufacturing process because it is sufficient if the PMOS switch 11 (MP1) has a PMOS structure with a low-withstand voltage gate and a high-withstand voltage drain, so the PMOS switch 11 (MP1) will be understood without a cross-sectional view as the cross-sectional view illustrated in FIG. 2.

On the other hand, with respect to a MOSFET of a low-withstand voltage device, a general CMOS does not include an HV-Nwell. However, when it is used in the embodiments of the present invention, there is a need for a withstand voltage with respect to a Psub, so the MOSFET may have a low-withstand voltage MOSFET structure in which components are separated by an HV-Nwell, as illustrated in FIG. 2.

Figure 3A:
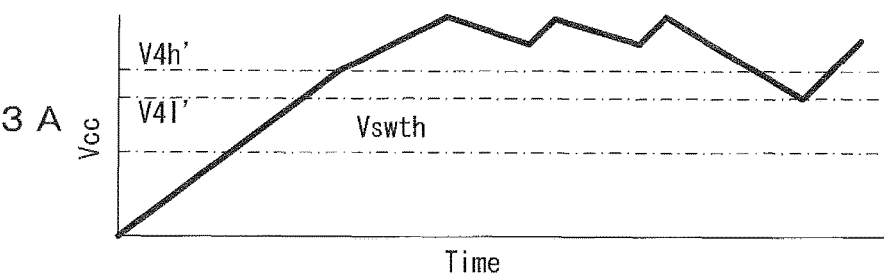
FIGS. 3A, 3B, 3C, and 3D are waveform diagrams for explaining an operation of the control circuit of a switching power supply according to the embodiments of the present invention.
Figure 3B:
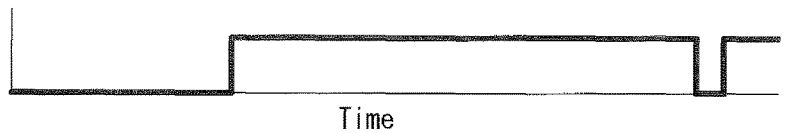
Figure 3C:
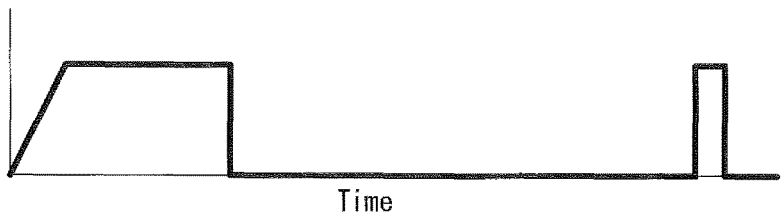
Figure 3D:
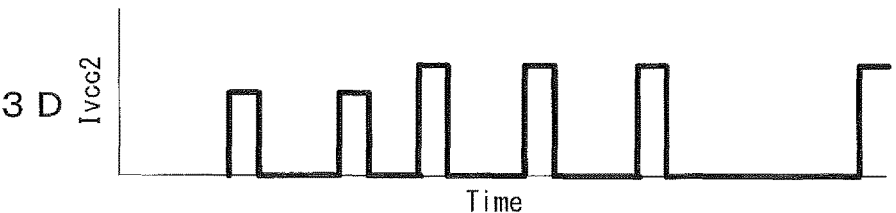

FIGS. 3A, 3B, 3C, and 3D are waveform diagrams for explaining an operation of the control circuit of a switching power supply according to the embodiments of the present invention. FIG. 3A illustrates a waveform of the power supply voltage Vcc for the control circuit, FIG. 3B illustrates a waveform of the output EN of the comparator 36 (U5), FIG. 3C illustrates a waveform of the constant current (the first activation current) Ivcc1 flowing through the activation circuit 10, and FIG. 3D illustrates a waveform of the current (a second activation current) Ivcc2 supplied from the auxiliary winding La on the primary side. A horizontal axis of each graph represents a time common to FIGS. 3A to 3D.

With respect to Vcc, which is represented by a vertical axis in FIG. 3A, two reference voltages V4$h'$ and V4$l'$ are set in the illustrative example. These two types of reference voltages V4$h'$ and V4$l'$ correspond to the reference voltages for comparison V4$h$ and V4$l$ of the comparator 36 (U5) described above.

In other words, when the voltage Vcc exceeds the reference voltage V4$h'$, the division voltage V3 obtained by dividing Vcc by the voltage division resistors R3$a$ and R3$b$ exceeds the reference voltage for comparison V4$h$ correspondingly.

Likewise, when the voltage Vcc falls below the reference voltage V4$l'$, the division voltage V3 obtained by dividing Vcc by the voltage division resistors R3$a$ and R3$b$ falls below the reference voltage for comparison V4$l$ correspondingly.

In the case of the configuration illustrated in FIG. 1, the reference voltages V4$h'$, V4$l'$, V4$h$, and V4$l$ have the following relationships.

$$V4h'=R3b/(R3a+R3b) \times V4h,\ V4l'=R3b/(R3a+R3b) \times V4l$$

The voltage Vcc is increased as time elapses as illustrated in FIG. 3A, and when the voltage Vcc reaches or exceed a potential Vswth, a switching operation (SW operation) of the switching element 35 (MN1) is started and the power supply terminal Vcc is supplied with the current (Ivcc2) from the auxiliary winding La.

When the voltage Vcc exceeds the reference voltage V4$h'$, the output EN of the comparator 36 (U5) becomes "High" as illustrated in FIG. 3B, which results in turning on the enable switch 13 (MP2) and turning off the activation PMOS switch 11 (MP1).

This permits the power supply terminal Vcc to be supplied with current only from the auxiliary winding La after the SW operation of the switching element 35 (MN1) is started (see FIGS. 3C and 3D).

After that, when the current Ivcc2 is not sufficiently supplied from the auxiliary winding La and the Vcc voltage is decreased to fall below the reference voltage V4$l'$, the output EN of the comparator 36 (U5) becomes "Low" again, which results in turning off the enable switch 13 (MP2) and turning on the activation PMOS switch 11 (MP1). As a result, the activation current Ivcc1 is supplied from the power supply Vh', which permits the voltage Vcc to be increased.

When the voltage Vcc is increased, the switching element control circuit 34 starts an operation to control the NMOS switching element 35 (MN1). The switching element control circuit 34 turns on/off the NMOS switching element 35 (MN1) so as to supply energy to the secondary side through the transformer 20.

At this point, energy is also supplied to the auxiliary winding La on the primary side of the transformer 20, and when the NMOS switching element 35 (MN1) is off, the secondary side and the auxiliary winding on the primary side enter an active state, and the current Ivcc2 (second activation current) flows through the auxiliary winding on the primary side. As well as the capacitor Ca, the capacitor Cvcc is also charged with the current Ivcc2, which results in increasing the voltage Vcc.

Figure 4:
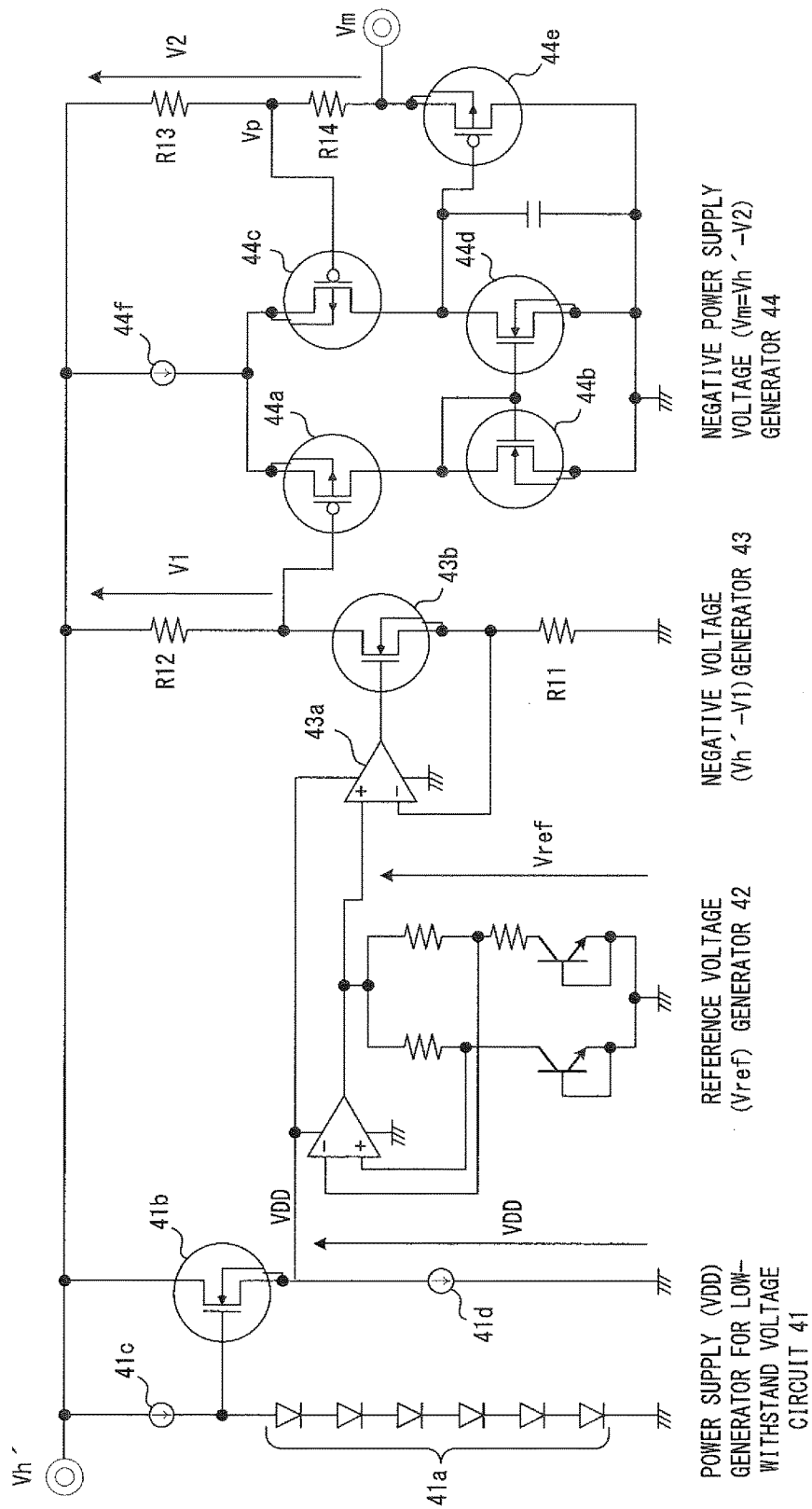
FIG. 4 illustrates an example of a circuit configuration of a negative power supply according to the embodiments of the present invention.
Figure 5:
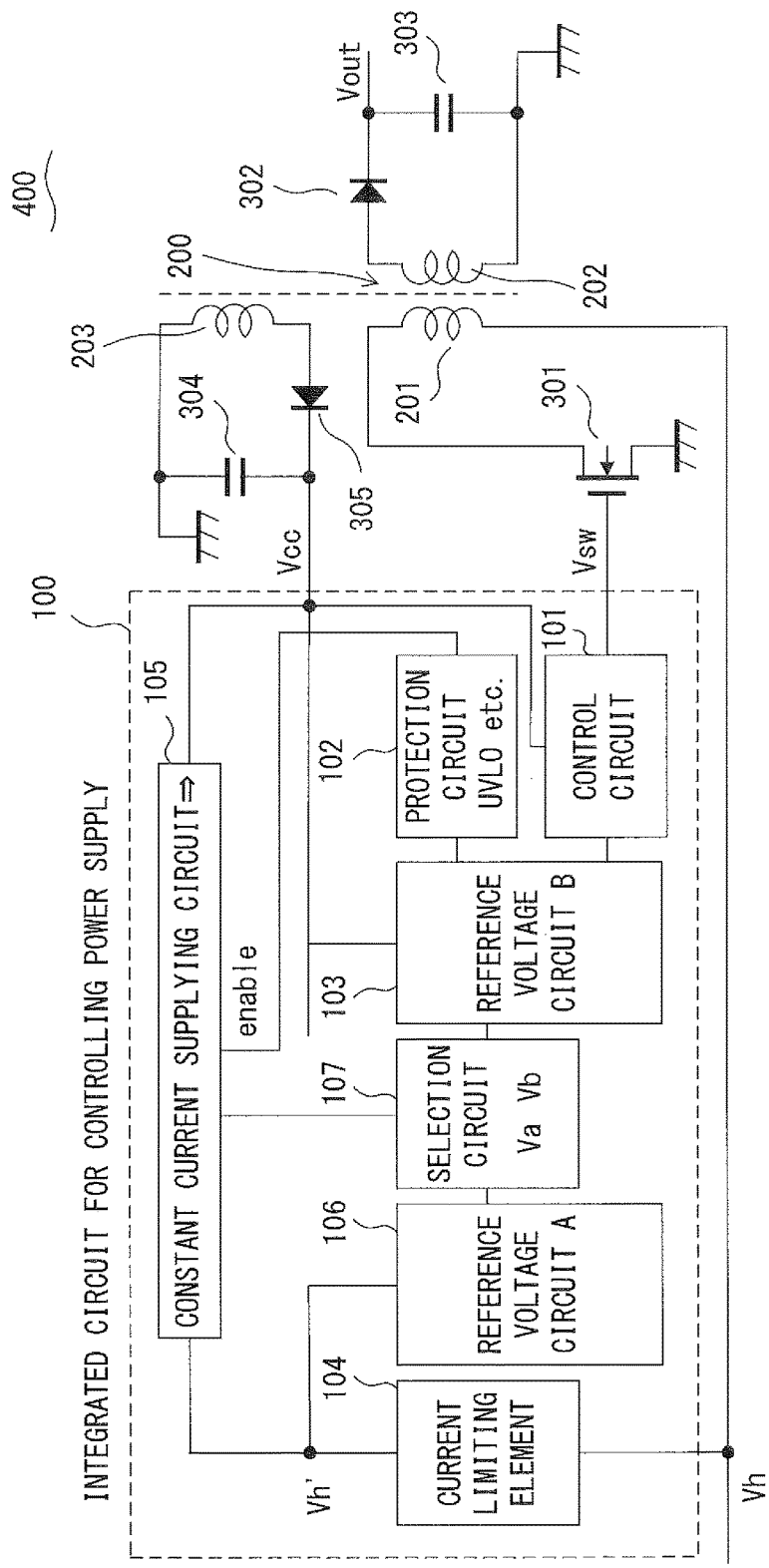
FIG. 5 illustrates a configuration of a conventional integrated circuit for controlling a power supply.
Figure 6:
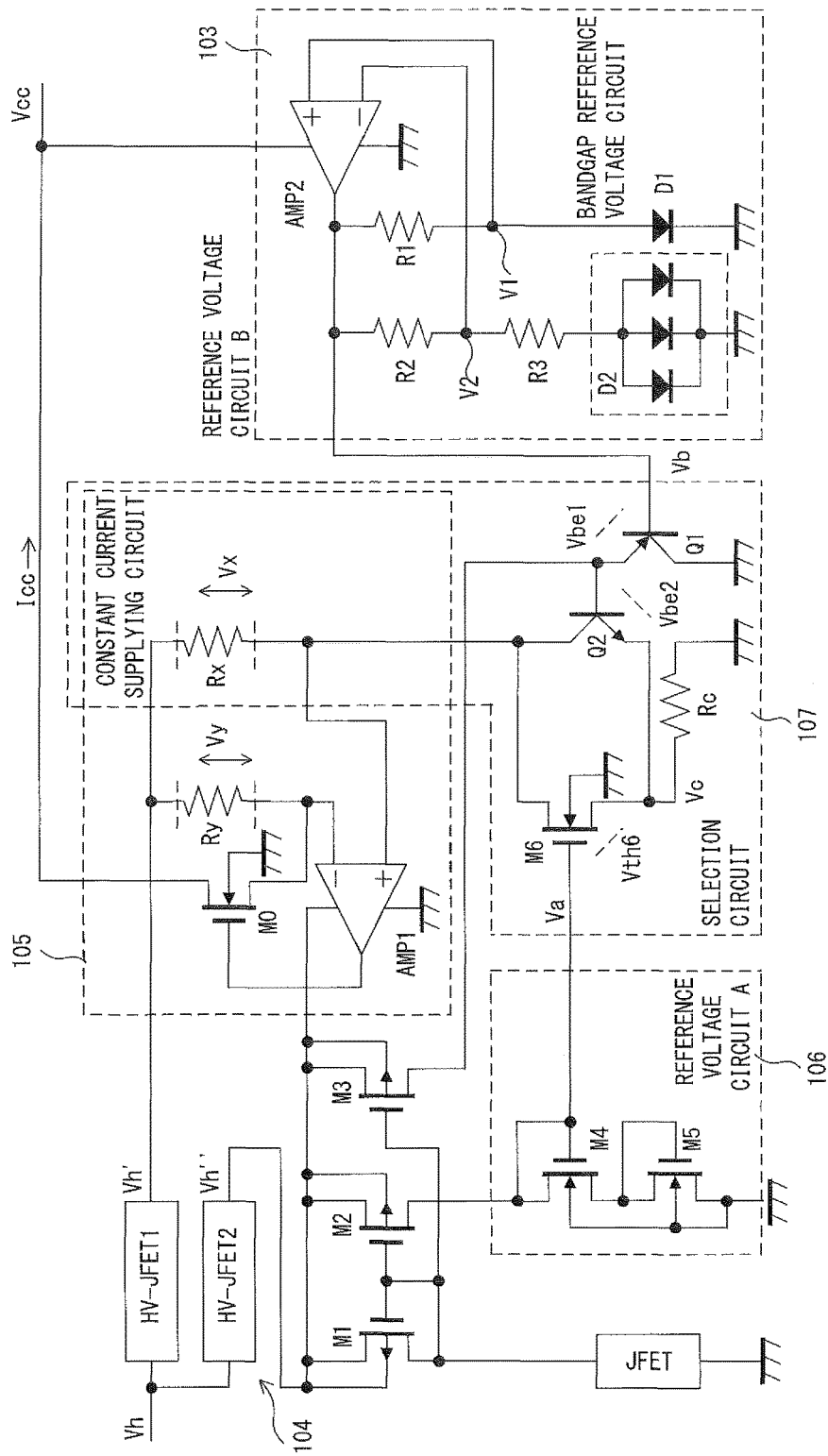
FIG. 6 illustrates a specific circuit configuration of the conventional integrated circuit for controlling a power supply.

FIG. 4 illustrates an example of a circuit configuration of the negative power supply according to the embodiments of the present invention. The negative power supply itself is a circuit that generates a voltage dropped from a reference voltage, and can be variously realized using existing circuit technologies. FIG. 4 is just an example of it.

Vh' and Vm in FIG. 4 are similar to Vh' and Vm of FIG. 1. In this case, the negative power supply 32 illustrated in FIG. 1 includes a generator 41 of a power supply (VDD) for a low-withstand voltage circuit, a reference voltage (Vref) generator 42, a negative voltage (Vh'-V1) generator 43, and a negative power supply voltage (Vm=Vh'-V2) generator 44, and generates and outputs the output voltage Vm on the basis of the input voltage Vh'.

The generator 41 of a power supply (VDD) for a low-withstand voltage circuit generates a low-voltage power supply voltage VDD from the input voltage Vh'. The generator 41 of a power supply (VDD) for a low-withstand voltage circuit includes a plurality of diodes that are series-connected to one another (a diode group 41$a$), an N-channel MOSFET 41$b$, and constant current sources 41$c$ and 41$d$.

The input voltage Vh' is divided by the series-connected diode group 41$a$ and the constant current source 41$c$, and a voltage obtained by the division is input to a gate of the N-channel MOSFET 41$b$.

The series-connected diode group 41$a$ and the N-channel MOSFET 41$b$ are configured for generating the low-voltage power supply voltage VDD, and when the number of diodes included in the diode group 41$a$ is n, the following is derived:

VDD≈($n \times$ forward voltage of diode−threshold voltage between gate and source of N-channel MOSFET 41$b$)

The N-channel MOSFET 41$b$ that generates VDD is included in a source follower circuit.

The reference voltage (Vref) generator 42 generates a reference voltage Vref from the power supply voltage VDD described above. The reference voltage (Vref) generator 42 is a so-called bandgap reference circuit and is well known to persons skilled in the art, so it will not be described in detail.

Next, the negative voltage (Vh'-V1) generator 43 includes a resistor R12, an N-channel MOSFET 43$b$, and a resistor R11 that are series-connected to one another between Vh' described above and the ground, as well as an operational amplifier 43$a$.

The power supply of the operational amplifier 43a is VDD described above, and the output of the operational amplifier 43a is input to a gate of the N-channel MOSFET 43b described above.

The reference voltage Vref described above and a voltage between both ends of the resistor R11 are input to the operational amplifier 43a.

Due to a virtual short of an operational amplifier, the voltage Vref is applied to the resistor R11 and current I=Vref/R11 flows through the resistor R11. This current I flows through the resistor R12 without any change, so a voltage drop V1 due to the resistor R12 is as follows:

$$V1=I \cdot R12=Vref \cdot R12/R11$$

Finally, in the negative power supply voltage (Vm) generator 44, a voltage drop V2 occurs due to resistors R13+R14 (illustrated), so Vm=Vh'−V2.

Here, in the negative power supply voltage generator 44 that generates the negative power supply voltage (Vm=Vh'−V2), a circuit that includes MOSFETs 44a to 44e (illustrated) constitutes an operational amplifier.

One of the inputs of this operational amplifier is a voltage "Vh'−V1", the other input is a voltage Vp at a connection point of the resistors R13 and R14 (illustrated), and the output of the operational amplifier is Vm.

Due to a virtual short of the operational amplifier that includes the MOSFETs 44a to 44e, the voltage Vp at the connection point of the resistors R13 and R14 is equal to "Vh'−V1".

In other words, a voltage drop due to the resistor R13 is equal to V1. As a result, the voltage drop V2 due to the resistors R13+R14 is represented by the following formula:

$$V2=V1 \cdot (R13+R14)/R13=(Vref \cdot R12/R11) \cdot (R13+R14)/R13$$

$$=Vref \cdot R12 \cdot (R13+R14)/(R11 \cdot R13)$$

On the other hand, Vm=Vh'−V2, and in the example described above, the negative power supply output voltage Vm is set such that Vm=Vh'−5V, so V2=5(V). In other words, it is possible to realize the negative power supply 32 by setting the values of the resistors R11, R12, R13, and R14, and of Vref, such that V2 described above is 5(V).

A MOSFET symbol circled with a large circle in FIG. 4 indicates a MOSFET in which a withstand voltage between a source and a drain is high. However, its gate is a low-withstand voltage one.

As described above, according to the present invention, an activation switch (the PMOS switch 11 (MP1)) and a control circuit that controls the activation switch (the control amplifier 12 (U4), the enable switch 13 (MP2), and the level conversion circuit 33 (U3)) can be realized by a low-withstand voltage gate process, so there is no need for a thick-film gate process as previously, which results in providing an advantage such that the manufacturing process is made more advantageous.

According to the control circuit of a switching power supply of the present invention, an activation switch and a control circuit that controls the activation switch can be realized by a low-withstand voltage-gate manufacturing process, so there is no need for a thick-film gate process as previously, which results in providing an advantage such that the manufacturing process is made more advantageous.

What is claimed is:

1. A control circuit of a switching power supply that controls a switching element using a switching element control circuit so as to convert a DC input voltage into a DC output voltage, the control circuit of the switching power supply comprising:
   an activation element that decreases the DC input voltage so as to generate a second input power supply voltage;
   an activation circuit that generates a first activation current from the second input power supply voltage when the switching power supply is activated, so as to control a voltage of a control power supply that is applied to the switching element control circuit; and
   a negative power supply that generates a power supply voltage that is negative when the second input power supply voltage output from the activation element is used as a reference, wherein
   the activation circuit further comprises
       a current detection resistor having at least one end connected to the second input power supply voltage,
       a first PMOSFET that is connected between at least an other end of the current detection resistor and the control power supply, and
       a control amplifier that comprises an operational amplifier that is controlled to operate in a range between the second input power supply voltage and a negative voltage output from the negative power supply, in order to enable generation of the first activation current from the second input power supply voltage;
   wherein
   the control amplifier obtains a first input voltage from the at least the other end of the current detection resistor, obtains a second input voltage from an output of a constant voltage source having at least one end connected to the second input power supply voltage, and inputs an output of the control amplifier to a gate of the first PMOSFET, so as to obtain the first activation current when the switching power supply is activated.

2. The control circuit of the switching power supply according to claim 1, wherein
   the constant voltage source comprises a voltage conversion resistor having at least one end connected to the second input power supply voltage and a current source that is connected to another end of the voltage conversion resistor, the other end of the voltage conversion resistor being used as an output of the constant voltage source.

3. The control circuit of the switching power supply according to claim 1, wherein
   the activation circuit comprises a second PMOSFET that is connected between the second input power supply voltage and the gate of the first PMOSFET, and
   when a voltage value of the control power supply is greater than a predetermined value, the second PMOSFET is turned on and the first PMOSFET is shut off.

4. The control circuit of the switching power supply according to claim 2, wherein
   the activation circuit comprises a second PMOSFET that is connected between the second input power supply voltage and the gate of the first PMOSFET, and
   when a voltage value of the control power supply is greater than a predetermined value, the second PMOSFET is turned on and the first PMOSFET is shut off.

5. The control circuit of the switching power supply according to claim 1, further comprising:
   a comparator that determines whether a voltage value of the control power supply is not less than a predetermined value; and a level conversion circuit that inputs a signal level-shifted on a basis of an output of the comparator to a gate of a second PMOSFET.

6. The control circuit of the switching power supply according to claim 2, further comprising:
a comparator that determines whether a voltage value of the control power supply is not less than a predetermined value; and
a level conversion circuit that inputs a signal level-shifted on a basis of an output of the comparator to a gate of a second PMOSFET.

7. The control circuit of the switching power supply according to claim 3, further comprising:
a comparator that determines whether the voltage value of the control power supply is not less than the predetermined value; and
a level conversion circuit that inputs a signal level-shifted on a basis of an output of the comparator to a gate of the second PMOSFET.

8. The control circuit of the switching power supply according to claim 4, further comprising:
a comparator that determines whether the voltage value of the control power supply is not less than the predetermined value; and
a level conversion circuit that inputs a signal level-shifted on a basis of an output of the comparator to a gate of the second PMOSFET.

9. The control circuit of the switching power supply according to claim 1, wherein
the first PMOSFET has a semiconductor structure having a low-withstand voltage gate and a high-withstand voltage drain.

10. The control circuit of the switching power supply according to claim 3, wherein
a MOSFET that constitutes the control amplifier and the second PMOSFET each have a device structure having a low-withstand voltage gate and a low-withstand voltage drain, wherein a semiconductor substrate and a portion in which the MOSFET is formed are separated by a high-withstand voltage well in the device structure.

11. The control circuit of the switching power supply according to claim 1, wherein
a range of a voltage input to a second PMOSFET is between the second input power supply voltage and the negative voltage output from the negative power supply.

12. The control circuit of the switching power supply according to claim 2, wherein
a range of a voltage input to a second PMOSFET is between the second input power supply voltage and the negative voltage output from the negative power supply.

13. The control circuit of the switching power supply according to claim 9, wherein
a range of a voltage input to a second PMOSFET is between the second input power supply voltage and the negative voltage output from the negative power supply.

14. The control circuit of the switching power supply according to claim 10, wherein
a range of a voltage input to the second PMOSFET is between the second input power supply voltage and the negative voltage output from the negative power supply.

15. An insulated switching power supply comprising the control circuit of the switching power supply according to claim 1.

16. An insulated switching power supply comprising the control circuit of the switching power supply according to claim 2.

17. An insulated switching power supply comprising the control circuit of the switching power supply according to claim 9.

18. An insulated switching power supply comprising the control circuit of the switching power supply according to claim 10.

* * * * *